(12) United States Patent
Togawa

(10) Patent No.: US 7,564,543 B2
(45) Date of Patent: Jul. 21, 2009

(54) DEFECTIVE PIXEL CORRECTION APPARATUS FOR LIQUID CRYSTAL PANEL

(75) Inventor: Ryuichi Togawa, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 165 days.

(21) Appl. No.: 11/534,006

(22) Filed: Sep. 21, 2006

(65) Prior Publication Data

US 2007/0182954 A1 Aug. 9, 2007

(30) Foreign Application Priority Data

Feb. 3, 2006 (JP) ............................. 2006-027394

(51) Int. Cl.
*G01N 21/00* (2006.01)
*G02F 1/13* (2006.01)

(52) U.S. Cl. ..................... 356/237.1; 349/54; 349/192

(58) Field of Classification Search ... 356/237.1–237.5, 356/239.1–239.3; 349/192, 55, 8, 54, 690
See application file for complete search history.

(56) References Cited

U.S. PATENT DOCUMENTS

| | | | | |
|---|---|---|---|---|
| 5,280,374 A | * | 1/1994 | Nakai et al. ................. | 349/192 |
| 2004/0021863 A1 | * | 2/2004 | Kurata et al. ................ | 356/364 |
| 2005/0213022 A1 | * | 9/2005 | Kawada ...................... | 349/192 |
| 2006/0087321 A1 | | 4/2006 | Kawada et al. | |
| 2006/0087613 A1 | | 4/2006 | Togawa et al. | |
| 2006/0285068 A1 | * | 12/2006 | Kawada et al. .............. | 349/192 |

FOREIGN PATENT DOCUMENTS

| | | |
|---|---|---|
| CN | 1326837 A | 12/2001 |
| CN | 1483547 A | 3/2004 |
| EP | 0 504 850 | 9/1992 |
| JP | 7-124764 | 5/1995 |
| JP | 11-90659 | 4/1999 |
| JP | 2001-133803 | 5/2001 |
| JP | 2001-340980 | 12/2001 |
| JP | 2003-107479 | 4/2003 |
| JP | 2003262842 A * | 9/2003 |
| JP | 2004-66344 | 3/2004 |
| JP | 2004160520 A * | 6/2004 |
| JP | 2005-33007 | 2/2005 |
| KR | 2003-27710 | 4/2003 |

OTHER PUBLICATIONS

U.S. Appl. No. 11/534,006, filed Sep. 21, 2006, Togawa.

* cited by examiner

*Primary Examiner*—Hoa Q Pham
(74) *Attorney, Agent, or Firm*—Oblon, Spivak, McClelland, Maier & Neustadt, P.C.

(57) ABSTRACT

A defective pixel correction apparatus has a laser output section and a measurement mechanism. The laser output section has an adjustment function of adjusting an intensity of a laser beam. The measurement mechanism measures an intensity of a laser beam reflected from a defective pixel.

2 Claims, 2 Drawing Sheets

DEFECTIVE PIXEL CORRECTION APPARATUS FOR LIQUID CRYSTAL PANEL

CROSS-REFERENCE TO RELATED APPLICATIONS

This application is based upon and claims the benefit of priority from prior Japanese Patent Application No. 2006-027394, filed Feb. 3, 2006, the entire contents of which are incorporated herein by reference.

BACKGROUND OF THE INVENTION

1. Field of the Invention

The present invention relates to a correction apparatus which irradiates defective bright points with a laser beam to reduce the number of defective bright points.

2. Description of the Related Art

A liquid crystal panel has an array substrate made of a glass substrate, a color filter substrate made of a glass substrate, and liquid crystal enclosed between these substrates.

In the array substrate, a large number of signal lines and gate lines are arranged in a matrix. At intersecting portions between the signal lines and the gate lines, TFTs (Thin Film Transistors) are provided to discharge electric charges to pixel electrodes. A large number of pixel electrodes each having a size of 100 to 400 μm or so are provided in a matrix, respectively neighboring the TFTs. In the color filter substrate, a coloring layer, a protection film, and a transparent conductive film are formed. A polarizing filter is provided in the surface of each glass substrate. When a liquid crystal panel is shipped as a commercial product, a protection film is provided on the surface of the liquid crystal panel.

Meanwhile, if a liquid crystal panel includes a portion where TFTs malfunction or a portion where pixel electrodes have not been formed normally, pixels corresponding to such a defective portion cannot shield light penetration. In this case, these pixels appear as defective bright points.

According to a method of correcting a defective bright point, defective bright points are reduced. More specifically, defective bright points are reduced by cutting a wire on a substrate or by melting a metal layer.

To correct thus a defective portion in a process object which is a target to be processed, a laser is used. A technique of this kind is disclosed in, for example, Jpn. Pat. Appln. KOKAI Publications No. 7-124764, No. 11-90659, and No. 2005-33007.

In order to reduce defective bright points by irradiation of a laser beam as described above, a laser beam of a predetermined intensity needs to reach a defective bright point. However, a laser beam irradiated from a laser output section is polarized by a polarizing filter so that the intensity thereof is weakened. Further, some liquid crystal panels may include flaws in their protection films. These flaws or the like influence a laser beam to scatter on the protection films.

Only a part of the laser beam outputted from the laser output section as described above reaches a defective bright point. That is, an intensity ratio of such a part of a laser beam that actually reaches a defective bright point to the laser beam outputted from a laser output section varies depending on individual liquid crystal panels.

A success rate hence lowers in case of correcting a defective bright point with an output thereof kept constant by a laser output section. Besides, work efficiency deteriorates since laser irradiation is repeated until a defective bright point is corrected while observing this point.

BRIEF SUMMARY OF THE INVENTION

According to an aspect of the present invention, there is provided a defective pixel correction apparatus for a liquid crystal panel, which irradiates a laser beam on a defective pixel in a liquid crystal panel, to correct the defective pixel. The defective pixel correction apparatus for a liquid crystal panel has a laser output section and a measurement mechanism. The laser output section outputs a laser beam and has an adjustment function of adjusting an intensity of the laser beam. The measurement mechanism which measures an intensity of the laser beam reflected by the defective pixel.

According to another aspect of the present invention, there is provided a defective pixel correction apparatus for a liquid crystal panel, which has a laser output section and a monitor section. The laser output section outputs a laser beam and has an adjustment function of adjusting an intensity of the laser beam. The monitor section includes a light source, a band-pass filter, and a pickup section. The light source outputs light for monitor toward the defective pixel. The band-pass filter allows a part of light reflected by the defective pixel and having a particular wavelength to pass. The pickup section picks up the light reflected by the defective pixel and having passed through the band-pass filter.

The present invention realizes improvement of a success rate of correcting defective pixels in a liquid crystal panel and improvement of work efficiency of correction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
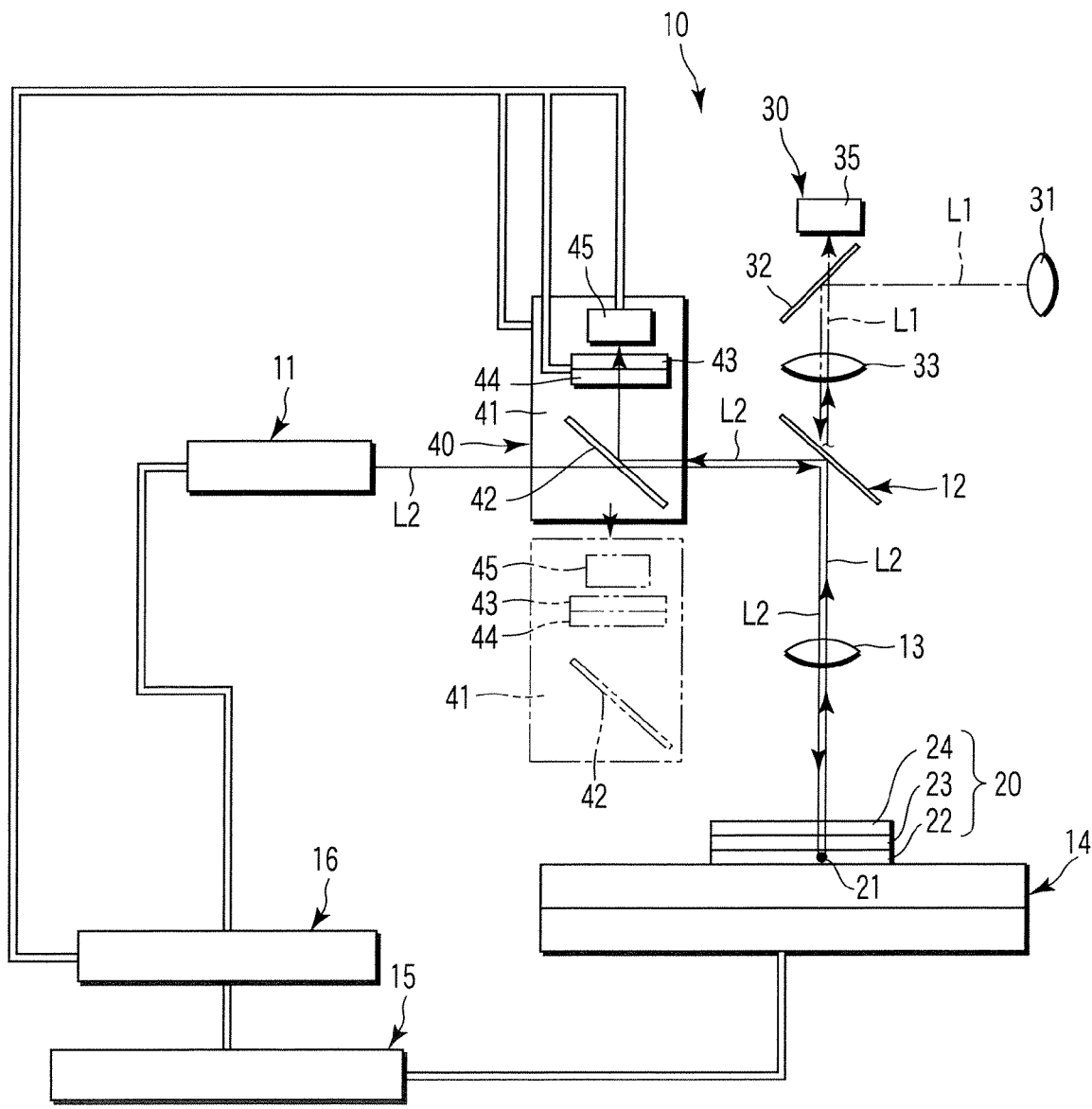
FIG. 1 is a schematic diagram showing a configuration of a defective pixel correction apparatus for a liquid crystal panel, according to the first embodiment of the present invention.

A defective pixel correction apparatus for a liquid crystal panel according to the first embodiment of the present invention will now be described with reference to FIG. 1. FIG. 1 is a schematic diagram showing a configuration of a correction apparatus 10. The correction apparatus 10 is an apparatus which corrects a defective bright point 21 in a liquid crystal panel 20.

As shown in FIG. 1, the liquid crystal panel 20 has a panel body 22, a polarizing plate 23, and a protection film 24. The panel body 22 is configured to include a pair of glass substrates not shown and liquid crystal contained between the pair of glass substrates.

One glass substrate is an array substrate. In the array substrate, a large number of signal lines and gate lines are formed in a matrix. At intersecting portions between the signal lines and the gate lines, TFTs (Thin Film Transistors) are provided to discharge electric charges to pixel electrodes. A large number of pixel electrodes each having a size of 100 to 400 μm or so are provided in a matrix on the array substrate.

The other glass substrate is a color filter substrate. In the color filter substrate, a coloring layer, a protection film, and a transparent conductive film are formed. The transparent conductive film forms a common electrode of the liquid crystal panel 20 and covers a whole surface of the color filter substrate in a side facing liquid crystal. A defective bright point 21 is created in the panel body 22. The defective bright point 21 is merely an example of a so-called defective pixel in the present invention.

If the liquid crystal panel 20 includes a portion where a TFT malfunctions or pixel electrodes have not been formed normally, a pixel corresponding to such a malfunctioning portion cannot shield light penetration. In this case, this pixel appears as a defective bright point.

The polarizing plate 23 is provided on the surface of the panel body 22. The protection film 24 is provided on the surface of the polarizing plate 23.

The correction apparatus 10 has a laser output section 11, a first mirror 12, a first condensing lens 13, an XY stage 14, a stage drive section 15, a control section 16, a monitor section 30, and a measurement mechanism 40. The liquid crystal panel 20 is set on the XY stage 14.

The laser output section 11 outputs a laser beam toward the liquid crystal panel 20 set on the XY stage 14. The laser output section 11 has a function of adjusting an intensity of the laser beam to be outputted.

The first mirror 12 is provided in a downstream side of the laser output section 11 on an optical path of the laser. The first mirror 12 reflects a part of the laser beam to change an optical path thereof. A transmittance and a reflectance of the first mirror 12 are obtained in advance.

The first condensing lens 13 is provided in a downstream side of the first mirror 12 on the optical path of the laser. The first condensing lens 13 converges the part of the laser beam reflected by the first mirror 12.

The stage drive section 15 drives the XY stage 14. More specifically, the stage drive section 15 moves a defective bright point 21 in the liquid crystal panel 20 to a process point of the laser beam condensed by the first condensing lens 13.

The monitor section 30 has a light source 31, a second mirror 32, a second condensing lens 33, and a CCD camera 35.

The light source 31 outputs light L1 toward the liquid crystal panel 20. In the figure, the light L1 is denoted by a one-dot chain line and is partially omitted.

The second mirror 32 is provided in a downstream side of the light source 31 on an optical path of the light source 31. A part of the light L1 outputted from the light source 31 is reflected by the second mirror 32, so that the optical path of this part of light is changed and guided to the second condensing lens 33. A transmittance and a reflectance of the second mirror 32 are obtained in advance.

The second condensing lens 33 is provided in a downstream side of the second mirror 32 on the optical path of the light source 31. Light which has reached the second condensing lens 33 is condensed by the second condensing lens 33. The part of the light L1 condensed by the second condensing lens 33 passes through the first mirror 12 and the first condensing lens 13, and reaches a process point of a laser beam outputted by the laser output section 11.

The CCD camera 35 is provided in a downstream side of the process point on the optical path of the light source 31.

The light L1 guided to the process point is reflected by the defective bright point 21, and then travels in a reverse direction along an approach route through which the light has taken from the light source 31 to the defective bright point 21. On the way of returning along the route, the light penetrates orderly the first and second condensing lenses 13 and 33, and the first and second mirrors 12 and 32. The light reaches the CCD camera 35 and is thereby picked up. The monitor section 30 monitors the defective bright point 21 in the liquid crystal panel 20. The CCD camera 35 is merely an example of a so-called image pickup section.

The measurement mechanism 40 has a base section 41, a third mirror 42, a polarizing filter 43, a polarizing filter rotation mechanism 44, and a photodiode 45. The third mirror 42, polarizing filter 43, polarizing filter rotation mechanism 44, and photodiode 45 are fixed to the base section 41.

The third mirror 42 is provided on the optical path of the laser beam outputted from the laser output section 11. The third mirror 42 reflects a part of the laser beam reflected by the defective bright point 21, to guide this part of the laser beam to the photodiode 45 described later. A transmittance and a reflectance of the third mirror 42 are obtained in advance. The base section 41 has a drive section to be movable. The base section 41 can move to a position where the third mirror 42 comes out of the optical path of the laser beam.

The polarizing filter 43 is provided in a downstream side of the third mirror 42 on the optical path of the laser beam reflected by the defective bright point 21. The polarizing filter 43 selectively allows penetration of only such light that has the same polarizing direction as light from a process portion of the defective bright point 21 among reflection light from the liquid crystal panel 20 and external light.

More specifically, parts of the laser beam outputted from the laser output section 11 which are reflected on surfaces of the protection film 24 and polarizing plate 23 have different polarizing directions than another part of the laser beam which is reflected by the defective bright point 21. Therefore, an orientation direction of the polarizing filter 43 is aligned with the polarizing direction of the part of the laser beam reflected by the defective bright point 21. Thus, selective penetration of reflection light from the defective bright point 21 can be allowed.

The polarizing filter rotation mechanism 44 adjusts the orientation direction of the polarizing filter 43 to an arbitrary direction. The photodiode 45 is provided in a downstream side of the polarizing filter 43 on the optical path of the laser beam reflected by the defective bright point 21. The photodiode 45 measures an intensity of the laser beam reflected by the defective bright point 21.

The control section 16 controls operations of the laser output section 11, stage drive section 15, base section 41, and polarizing filter rotation mechanism 44. Also, the control section 16 compares an intensity of the laser beam outputted from the laser output section 11 with an intensity thereof measured by the photodiode 45, to obtain a loss ratio of the laser beam lost until the laser beam reaches the defective bright point 21.

Next, operation of the correction apparatus 10 will be described with reference to a case of correcting a defective bright point 21 in the liquid crystal panel 20, for example.

At first, the liquid crystal panel 20 is set on the XY stage 14. Subsequently, the stage drive section 15 is driven to move the position of the defective bright point 21 to the process point. Further, the base section 41 of the measurement mechanism 40 is driven to move the third mirror 42 onto an optical path of the laser beam.

Subsequently, a measurement laser beam L2 is outputted from the laser output section 11. The measurement laser beam L2 is a laser beam with a weak intensity. More specifically, the intensity of the measurement laser beam L2 is weaker than an intensity which is considered necessary to correct the defective bright point 21.

The laser beam which the laser output section 11 outputs adopts such a wavelength that processes neither the protection film 24 nor the polarizing plate 23 but is absorbed by a metal material to cut only wires formed on each glass substrate of the panel body 22.

A part of the measurement laser beam L2 penetrates the third mirror 42. An intensity of the part of the measurement laser beam L2 which penetrates the third mirror 42 corresponds to the transmittance of the third mirror 42.

The first mirror 12 changes an optical path of the part of the measurement laser beam L2 which has passed through the third mirror 42. An intensity of the measurement laser beam L2 reflected by the first mirror 12 corresponds to the reflectance of the first mirror 12. The measurement laser beam L2 reflected by the first mirror 12 is converged by the first condensing lens 13, and then reaches the liquid crystal panel 20.

The measurement laser beam L2 which has reached the liquid crystal panel 20 enters firstly into the protection film 24. Due to some external factor during for example conveyance process, the protection film 24 sometimes has a flaw or damage in its surface.

A part of the measurement laser beam L2 which has reached the protection film 24 is reflected by the flaw. Therefore, the measurement laser beam L2 which has passed through the protection film 24 is a part of the measurement laser beam L2. The flaw formed in the surface of the protection film 24 is not big enough to break down the liquid crystal panel 20 but is formed naturally through process of manufacturing the liquid crystal panel 20, for example, when moving the liquid crystal panel 20.

The measurement laser beam L2 which has passed through the protection film 24 reaches the polarizing plate 23. The measurement laser beam L2 which has reached the polarizing plate 23 penetrates the polarizing plate 23 and thereby becomes a linear polarized beam along a polarizing direction of the polarizing plate 23. Therefore, a part of the measurement laser beam L2 which has reached the polarizing plate 23 penetrates the polarizing plate 23.

The measurement laser beam L2 which has penetrated the polarizing plate 23 reaches the defective bright point 21. As described above, due to influences of the first and third mirrors 12 and 42, the protection film 24, and the polarizing plate 23, merely a part of the measurement laser beam L2 outputted from the laser output section 11 reaches the defective bright point 21.

The measurement laser beam L2 which has reached the defective bright point 21 is reflected by the defective bright point 21. The reflected measurement laser beam L2 penetrates the polarizing plate 23 and reaches the protection film 24.

A surface of the protection film 24 in a side facing the polarizing plate 23 is hardly damaged to have flaws. It is hence possible to neglect substantially influence from scattering of light. Therefore, the measurement laser beam L2 which reaches the protection film 24 after reflection penetrates the protection film 24 substantially intactly.

A part of the measurement laser beam L2 which has penetrated the protection film 24 is reflected again by the first mirror 12. The measurement laser beam L2 reflected again by the first mirror 12 reaches the third mirror 42. A part of the measurement laser beam L2 which has reached the third mirror 42 is reflected by the third mirror 42 and reaches the polarizing filter 43.

An orientation direction of the polarizing filter 43 is adjusted in advance to the same direction as a polarizing direction of the reflected measurement laser beam L2 by the polarizing filter rotation mechanism 44. Therefore, of the measurement laser beam L2 which has reached the polarizing filter 43, a part reflected by the defective bright point 21 reaches the photodiode 45 substantially intactly. The photodiode 45 measures an intensity of the part of measurement laser beam L2 which has arrived.

The measurement laser beam L2 measured by the photodiode 45 has once reached the defective bright point 21 and then been reflected by the first and third mirrors 12 and 42. Therefore, the intensity of the measurement laser beam L2 which has reached the defective bright point 21 can be obtained by performing an inverse calculation based on reflectances of the first and third mirrors 12 and 42.

An intensity thus obtained of the measurement laser beam L2 which has reached the defective bright point 21 is compared with an intensity of the measurement laser beam L2 outputted from the laser output section 11. Then, a loss ratio of the measurement laser beam L2 lost before the laser beam reaches the defective bright point 21 is obtained.

Subsequently, the control section 16 moves the base section 41 of the measurement mechanism 40 so as to make the third mirror 42 deviate from the optical path.

Subsequently, the control section 16 obtains an intensity of a laser beam to be outputted from the laser output section 11 to correct the defective bright point 21. More specifically, an intensity of the laser beam which the laser output section 11 should irradiate to correct the defective bright point 21 is given by adding an add-on intensity considering the above-mentioned loss ratio to a necessary intensity of a laser beam for correction of the defective bright point 21 in case where previously measured influences of the protection film 24 and polarizing plate 23 are neglected.

A necessary intensity of the laser beam to correct a defective bright point 21 in the case of neglecting influences of the protection film 24 and polarizing plate 23 is not specific to the liquid crystal panel 20 but is common to liquid crystal panels manufactured in the same manner as the liquid crystal panel 20. Therefore, it is preferred to obtain in advance a necessary intensity of the laser beam for correction of this kind of liquid crystal panel in case of not having the protection film 24 or polarizing plate 23.

Subsequently, the control section 16 controls the laser output section 11 to irradiate a laser beam. At this time, the laser beam has an intensity necessary to correct the defective bright point 21. This laser beam corrects the defective bright point 21.

In the defective pixel correction apparatus 10 for a liquid crystal panel, configured as described above, a necessary laser beam intensity is known before correction, so that the success rate of correction improves. Further, the laser beam may be outputted twice to correct one defective bright point, one time for measurement and another for correction. Therefore, the laser beam is outputted a suppressed number of times so that efficiency of correction work of correcting a defective bright point improves.

Since the base section 41 of the measurement mechanism 40 is movable, the third mirror 42 is not positioned on the optical path when a laser beam for correction is outputted. The correction laser beam is not influenced by the third mirror 42 but reaches the defective bright point 21. Therefore, intensity loss of the laser beam is eliminated so that the defective bright point 21 is corrected efficiently.

In the present embodiment, the third mirror 42 is moved by moving the base section 41. The present invention is not limited to this configuration. For example, only the third mirror 42 may be movable.

Besides, the orientation direction of the polarizing filter 43 can be aligned with the polarizing direction of the reflected measurement laser beam L2 because the measurement mechanism 40 has the polarizing filter rotation mechanism 44. Therefore, the measurement laser beam L2 can be measured with good accuracy.

Next, a defective pixel correction apparatus for a liquid crystal panel according to the second embodiment of the present invention will be described with reference to FIG. 2. Those constituent elements that have the same functions as those of the first embodiment are denoted at the same reference symbols. Descriptions of those constituent elements will be omitted herefrom. The present embodiment differs from the first embodiment in a feature that a light source in a monitor section is used to attain intensity of output of a correction laser beam to be outputted from the laser output section 11. Other structure may be the same as those in the first embodiment. The difference will be described in detail.

Figure 2:
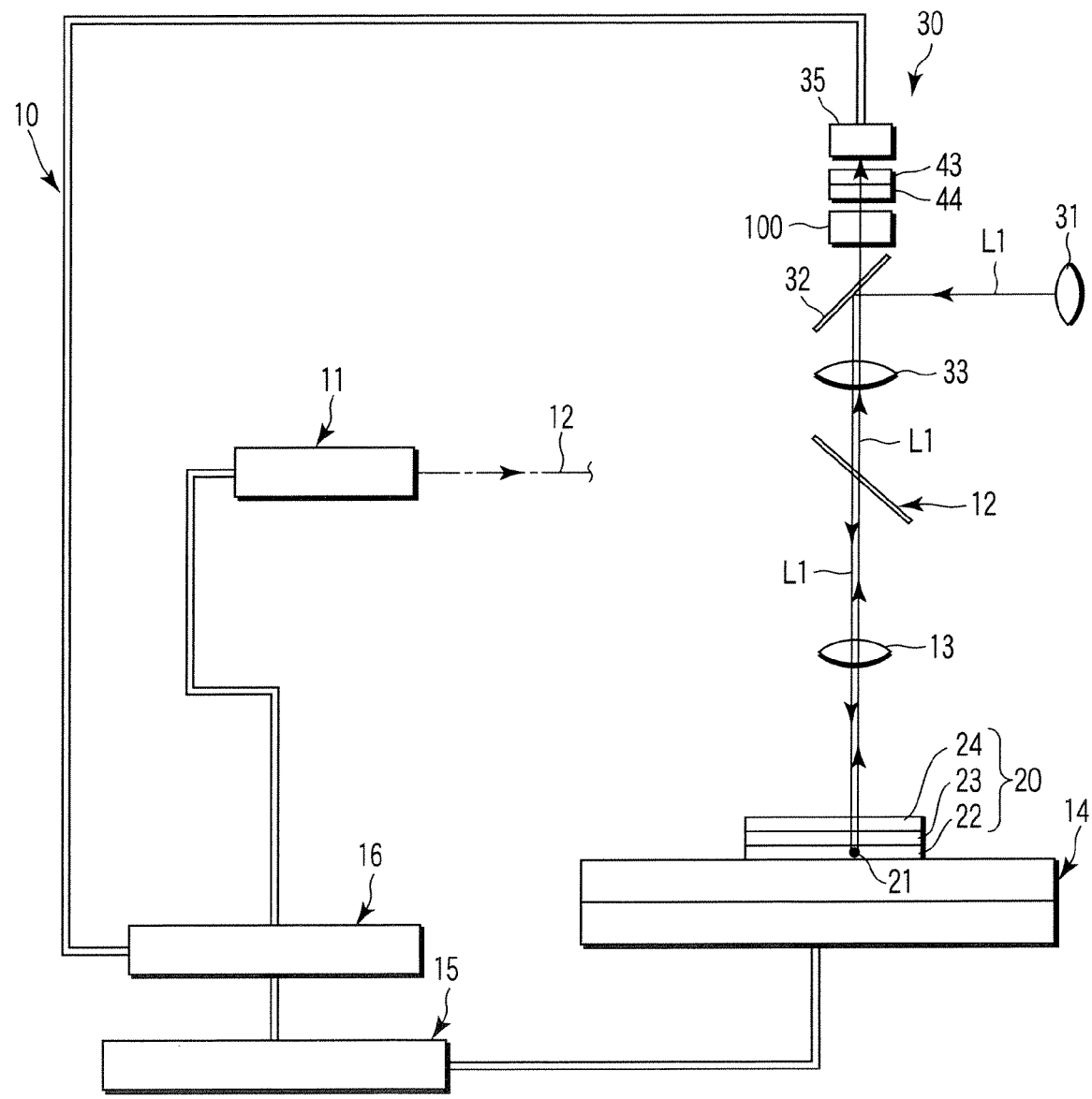
FIG. 2 is a schematic diagram showing a configuration of a defective pixel correction apparatus for a liquid crystal panel, according to the second embodiment of the present invention.

FIG. 2 shows a correction apparatus 10 according to the present embodiment. As shown in FIG. 2, the present embodiment employs a band-pass filter 100. The band-pass filter 100 is provided in a downstream side of a second mirror 32 and in an upstream side of a CCD camera 35, on an optical path of light L1 outputted from a light source 31. The band-pass filter 100 is set to be vertical to the optical axis of the optical path.

The band-pass filter 100 allows a part of the light L1 outputted from the light source 31 to pass, the part having a wavelength equal to or close to the wavelength of the measurement laser beam L2.

Therefore, the CCD camera 35 picks up such a part of the light L1 outputted from the light source 31 that has a wavelength equal to or close to the wavelength of the laser beam outputted from the laser output section 11 and that has passed through the band-pass filter 100.

A loss ratio until such a part of the light L1 that has a wavelength close to the wavelength of the laser beam outputted from the laser output section 11 reaches a defective bright point 21 is substantially the same as a loss ratio until the laser beam L2 outputted from the laser output section 11 reaches the defective bright point.

Therefore, the loss ratio until the laser beam L2 outputted from the laser output section 11 reaches the defective bright point 21 can be obtained by investigating the loss ratio until such a part of the light L1 outputted from the light source 31 that has a wavelength equal to or close to the wavelength of the laser beam outputted from the laser output section 11 reaches the defective bright point 21. In the present embodiment, the band-pass filter 100 allows a part of light to pass, the part having the same wavelength of, for example, 530 nm as the laser beam outputted from the laser output section 11.

A polarizing filter 43 is provided between the CCD camera 35 and the band-pass filter 100 on the optical path of the light L1 outputted from the light source 31. An orientation direction of the polarizing filter 43 is adjusted to an arbitrary direction by the polarizing filter rotation mechanism 44.

Next, operation of the correction apparatus 10 according to the present embodiment will now be described. At first, light L1 is outputted from the light source 31. An intensity of light contained in the light L1 and having a wavelength of, for example, 530 nm, is obtained in advance. A part of the light L1 is reflected by the second mirror 32. Such a part of the light L1 that has a wavelength of 530 nm is reflected by the second mirror 32 and the other passes through the second mirror 32.

A part of the light L1 reflected by the second mirror 32 passes through the first mirror 12. A part o the light L1 which has passed trough the first mirror 12 reaches a defective bright point 21 after passing through the protection film 24 and polarizing plate 23, as has been described in the first embodiment.

The light L1 which has reached the defective bright point 21 is reflected by the defective bright point 21. The light then passes through the polarizing plate 23, protection film 24, and first and second mirrors 12 and 32, and reaches the band-pass filter 100. Only a part of the light L1, which has reached the band-pass filter 100 and has a wavelength of 530 nm, passes through the band-pass filter 100.

The light which has passed through the band-pass filter 100 and has a wavelength of 530 nm reaches the polarizing filter 43. An orientation direction of the polarizing filter 43 is adjusted in advance to the same direction as a polarizing direction of the reflected light L1 by the polarizing filter rotation mechanism 44. The light L1 which has passed through the polarizing filter 43 reaches the CCD camera 35 and is picked up by the CCD camera 35. The CCD camera 35 measures an intensity of the light which has passed through the band-pass filter 100 and has a wavelength of 530 nm.

The intensity of the light having the wavelength of 530 nm, which has been measured as described above, is an intensity of light given by subtracting parts reflected by the first mirror 12 and the second mirror 32 and a part not having passed through the band-pass filter 100, from light which has reached the defective bright point 21 and has the wavelength of 530 nm.

Hence, an intensity of the light which has reached the defective bright point 21 is defined by adding an intensity considering the parts reflected by the first mirror 12 and second mirror 32 and the part not having passed through the band-pass filter 100, to the intensity of light having the wavelength of 530 nm, which has been measured by the CCD camera 35.

The control section 16 compares the intensity obtained above of the light which has reached the defective bright point 21 and has a wavelength of 530 nm, with the intensity of light having the wavelength of 530 nm of the light L1 outputted from the light source 31, thereby to obtain a loss ratio of the light having the wavelength of 530 nm. The loss ratio of the light having the wavelength of 530 nm is substantially the same as a loss ratio of the laser beam outputted from the laser output section 11.

Based on the obtained loss ratio, the control section 16 obtains a necessary laser beam intensity for correction of the defective bright point 21.

The correction apparatus 10 according to the present embodiment obtains a loss ratio of a laser beam by use of an existing monitor section 30 without optionally preparing a measurement mechanism 40. Therefore, the structure of the correction apparatus 10 need not be complex but can be simple.

In FIG. 2, the laser beam L2 outputted from the laser output section 11 is denoted by a one-dot chain line and is partially omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A defective pixel correction apparatus which irradiates a laser beam on a defective pixel in a liquid crystal panel, to correct the defective pixel, comprising:
   a laser output section which outputs first and second laser beams and including an adjustment function of adjusting an intensity of the second laser beam; and
   a measurement mechanism which measures an intensity of the first laser beam reflected by the defective pixel,
   wherein the laser output section adjusts the intensity of the second laser beam on the basis of the intensity of the reflected first laser beam measured by the measurement mechanism, and
   the measurement mechanism includes:
      a polarizing filter which polarizes the first laser beam reflected by the defective pixel; and
      a rotation mechanism which rotates and holds the polarizing filter so as to fix the polarizing filter oriented in an arbitrary orientation direction.

2. A defective pixel correction apparatus which irradiates a laser beam on a defective pixel in a liquid crystal panel, to correct the defective pixel, comprising:
   a laser output section which outputs a laser beam and includes an adjustment function of adjusting an intensity of the laser beam; and
   a monitor section including:
      a light source which outputs light for monitor toward the defective pixel,
      a band-pass filter which allows a part of light reflected by the defective pixel and having a particular wavelength to pass, and
      a pickup section which picks up the light reflected by the defective pixel and having passed through the band-pass filter,
      wherein the laser output section adjusts the intensity of the laser beam on the basis of the intensity of the light picked up by the pickup section.

* * * * *